May 5, 1936. M. A. EDGAR 2,039,477
EGG BOILING DEVICE
Filed Sept. 3, 1935
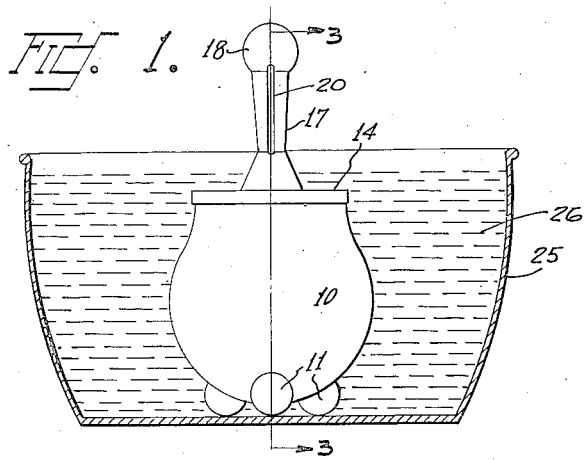
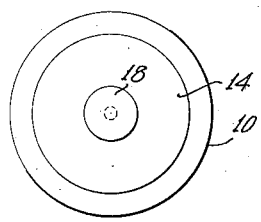
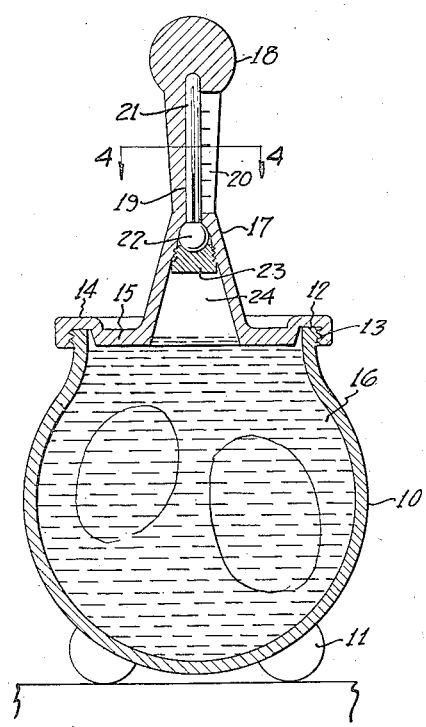
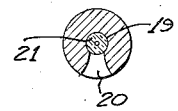
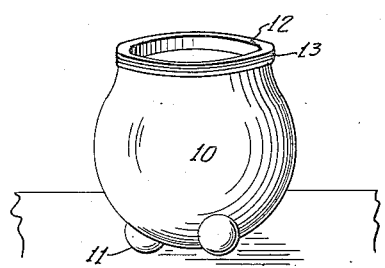
INVENTOR
MARY A. EDGAR
BY
ATTORNEY Patented May 5, 1936

2,039,477

UNITED STATES PATENT OFFICE 2,039,477

EGG BOILING DEVICE

Mary Alice Edgar, Portland, Oreg.

Application September 3, 1935, Serial No. 38,916

6 Claims. (Cl. 53—1)

This invention relates generally to the culinary art, and particularly to a receptacle for boiling eggs which have been removed from their shells.

The main object of this invention is the provision of a container for cooking and serving eggs in a manner that the cooking operation can be uniformly and thoroughly performed.

The second object is to provide a container and cover therefor in which heat will be applied directly to the egg uniformly from all directions and in which the progress of the cooking operation may be positively indicated.

The third object is to provide a cooking vessel for eggs which have been separated from their shells in which the container is provided with a water-tight cover having an upwardly extending stem forming a handle or a mounting for a thermometer.

These and other objects are accomplished in the manner set forth in the following specification as illustrated in the accompanying drawing, in which:

Fig 1 is a vertical section through a water container showing the device in elevation.

Fig. 2 is a plan of the device.

Fig. 3 is a vertical section taken along the line 3—3 in Fig. 1.

Fig. 4 is a horizontal section taken along the line 4—4 in Fig. 3.

Fig. 5 is a perspective view of the egg container in a serving position.

Similar numbers of reference refer to similar parts throughout the several views.

Referring in detail to the drawing, there is shown a somewhat spherical container 10 which is supported on the legs 11 and which has its uppermost end 12 provided with external threads 13. The capacity of the container 10 is normally equal to two ordinary sized hen's eggs, known as standard, running about one and a half pounds per dozen, although of course it can be made any other size without departing from the spirit of this invention.

The closure for the device consists of an internally threaded flat cover 14 having a downwardly extending central portion 15, which projects into the open end 12, the purpose being to bring same into close contact with the egg material 16. Rising from the cover 14 is an upright stem 17, whose uppermost end 18 is in the form of a knob to facilitate the handling of same. The stem 17 is provided with a central passage 19, which communicates with the exterior of the stem by means of a slot 20 to permit reading of a thermometer.

The passage 19 normally holds a thermometer tube 21, whose bulb 22 rests upon a removable plug 23 in the lower conical end 24 of the passage, which is in communication with the interior of the container when the cover is in position. When used with the thermometer tube 21, the cooking operation may be carefully gaged. In some cases, however, it will be desirable to dispense with the tube 21 and use the device with or without the plug 23.

In order to illustrate the invention, there is shown a water container 25 in which the device is placed when cooking the eggs, and the water 26 preferably, although not necessarily, covers the cover 14.

Either or both the container 10 and the cover 14 may be made of glass, metal or other suitable material without departing from the spirit of this invention.

I claim:

1. An egg boiling device, comprising an open container provided with external threads, a threaded cover therefor, a handled stem for said cover, said stem provided with a central passage and a slot at one side communicating with said passage.

2. An egg boiling device, comprising a container open at its upper end, said end provided with threads, and a threaded cover having an upwardly extending handle, the stem of the handle provided with a passage adapted to receive a thermometer.

3. An egg treating device comprising an open mouthed container, a cover therefor, water tight means for securing together the cover and container, the cover having a handle extending upwardly therefrom, the stem of said handle having a passage in communication with the container and adapted to hold a thermometer, a slot being provided in the stem for reading the thermometer.

4. A device of the class described, comprising an open container, a cover, means for forming a water tight connection between the two, an upwardly extending handle on the cover, a passage in the stem of the handle merging in a lower conical end, a detachable plug in said conical end, and a thermometer resting upon said plug and located in the passage.

5. The combination of claim 4, the stem having a slot to permit reading of the thermometer.

6. The combination of claim 4, the cover being depressed within the container.

MARY ALICE EDGAR.